Jan. 18, 1955　　　M. D. BEEM ET AL　　　2,699,772
MECHANIZED BED

Filed May 5, 1948　　　　　　　　　　　　8 Sheets-Sheet 1

INVENTORS
MARVEL D. BEEM AND
JOHN E. URBANY
BY
Lynn Walla
ATTORNEY

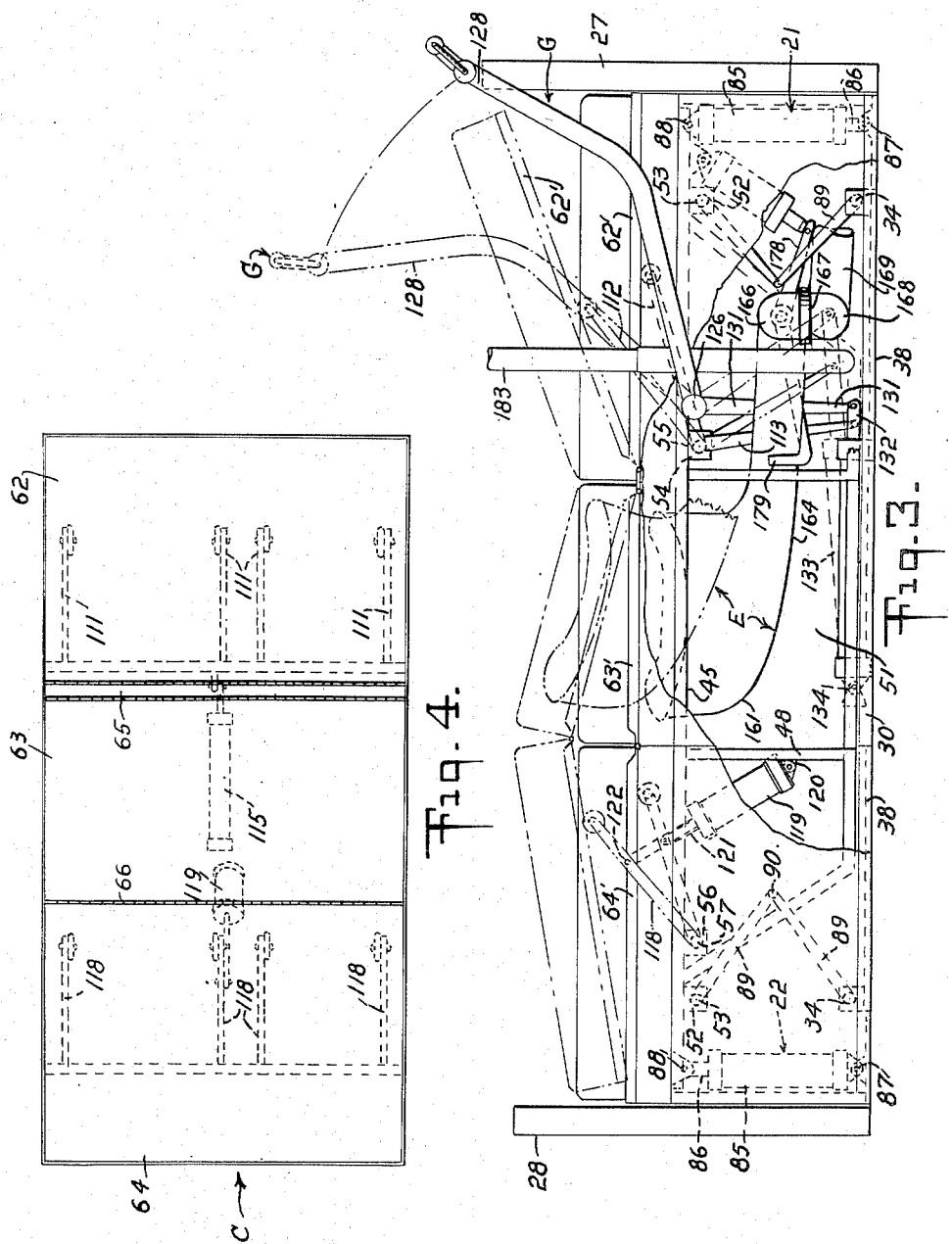

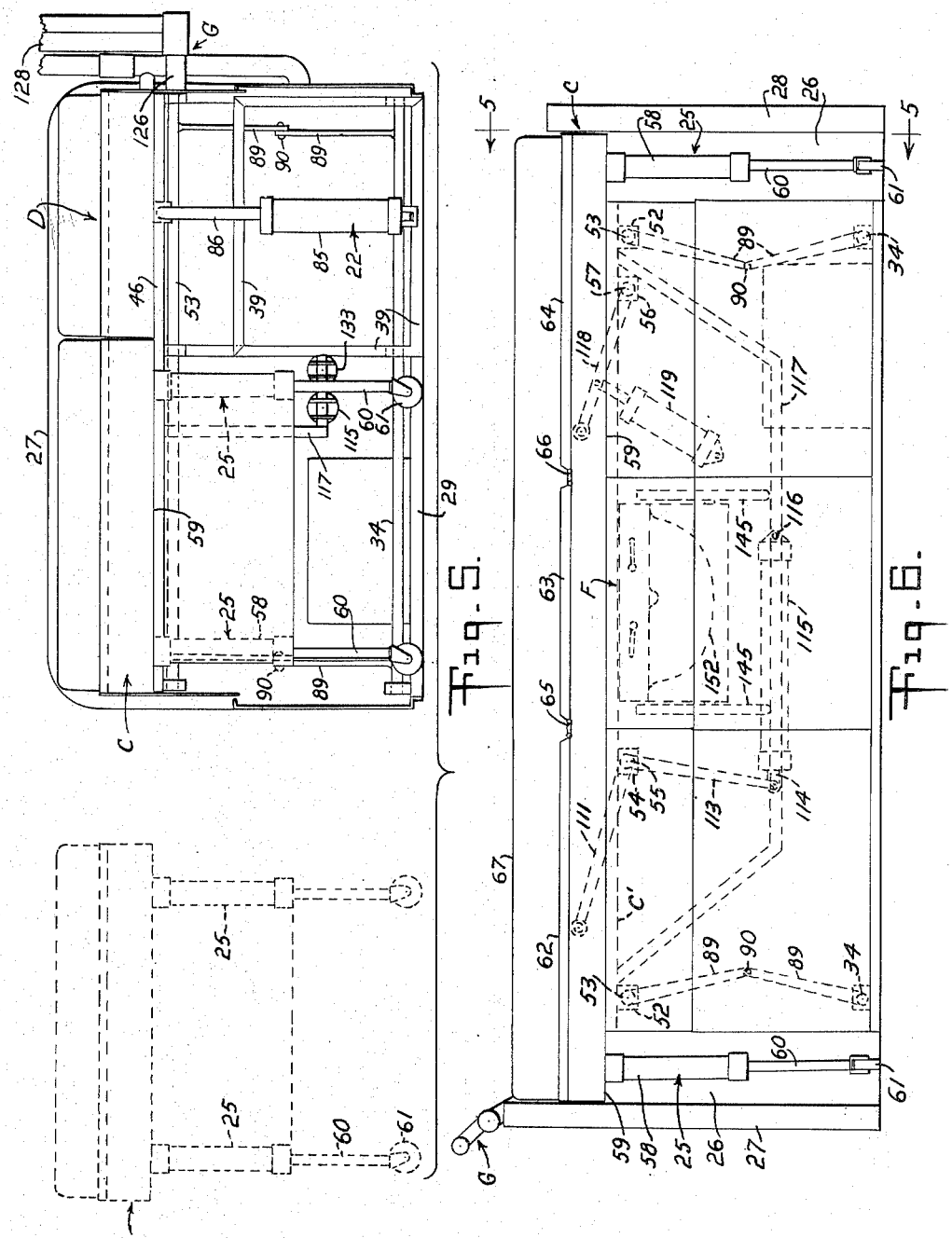

Jan. 18, 1955
M. D. BEEM ET AL
2,699,772
MECHANIZED BED
Filed May 5, 1948
8 Sheets-Sheet 5
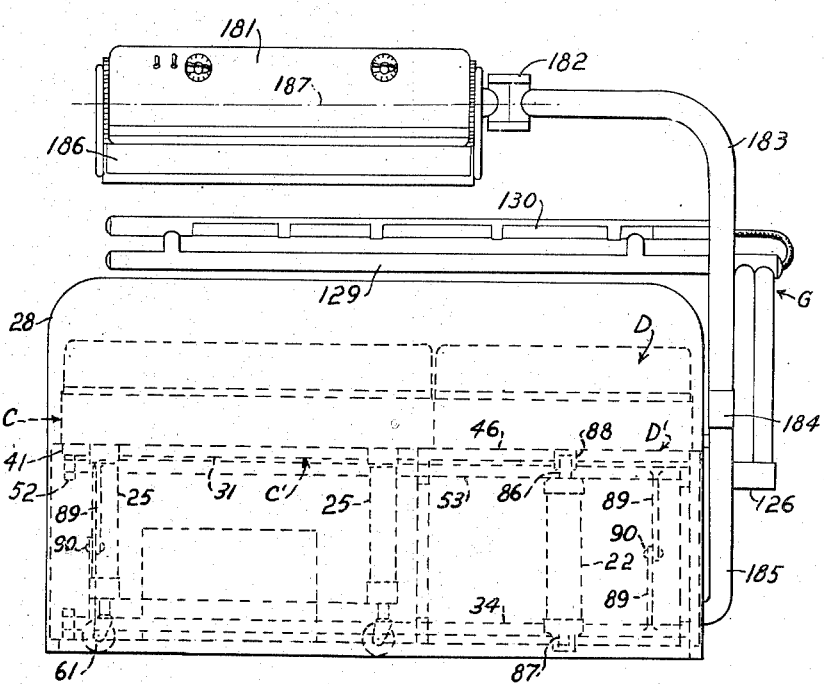
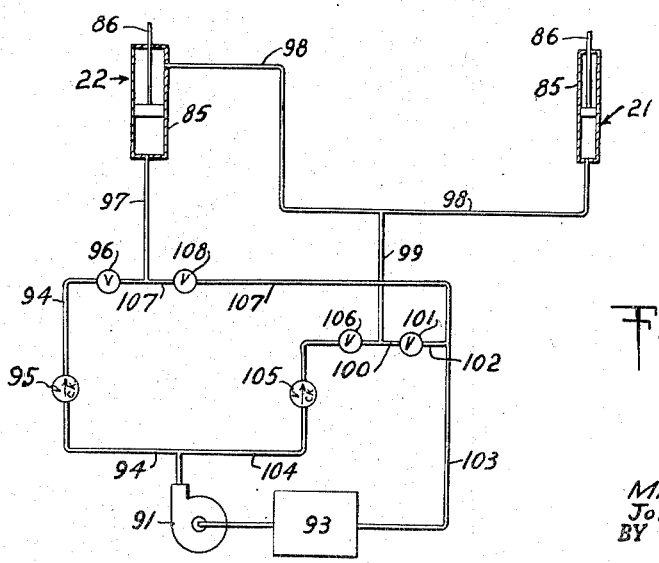
INVENTORS
MARVEL D. BEEM AND
JOHN E. URBANY
BY
ATTORNEY Jan. 18, 1955

M. D. BEEM ET AL 2,699,772

MECHANIZED BED

Filed May 5, 1948

INVENTORS
MARVEL D. BEEM AND
JOHN E. URBANY
BY

*Lynn Watta*

ATTORNEY

Jan. 18, 1955
M. D. BEEM ET AL
2,699,772
MECHANIZED BED
Filed May 5, 1948
8 Sheets-Sheet 7
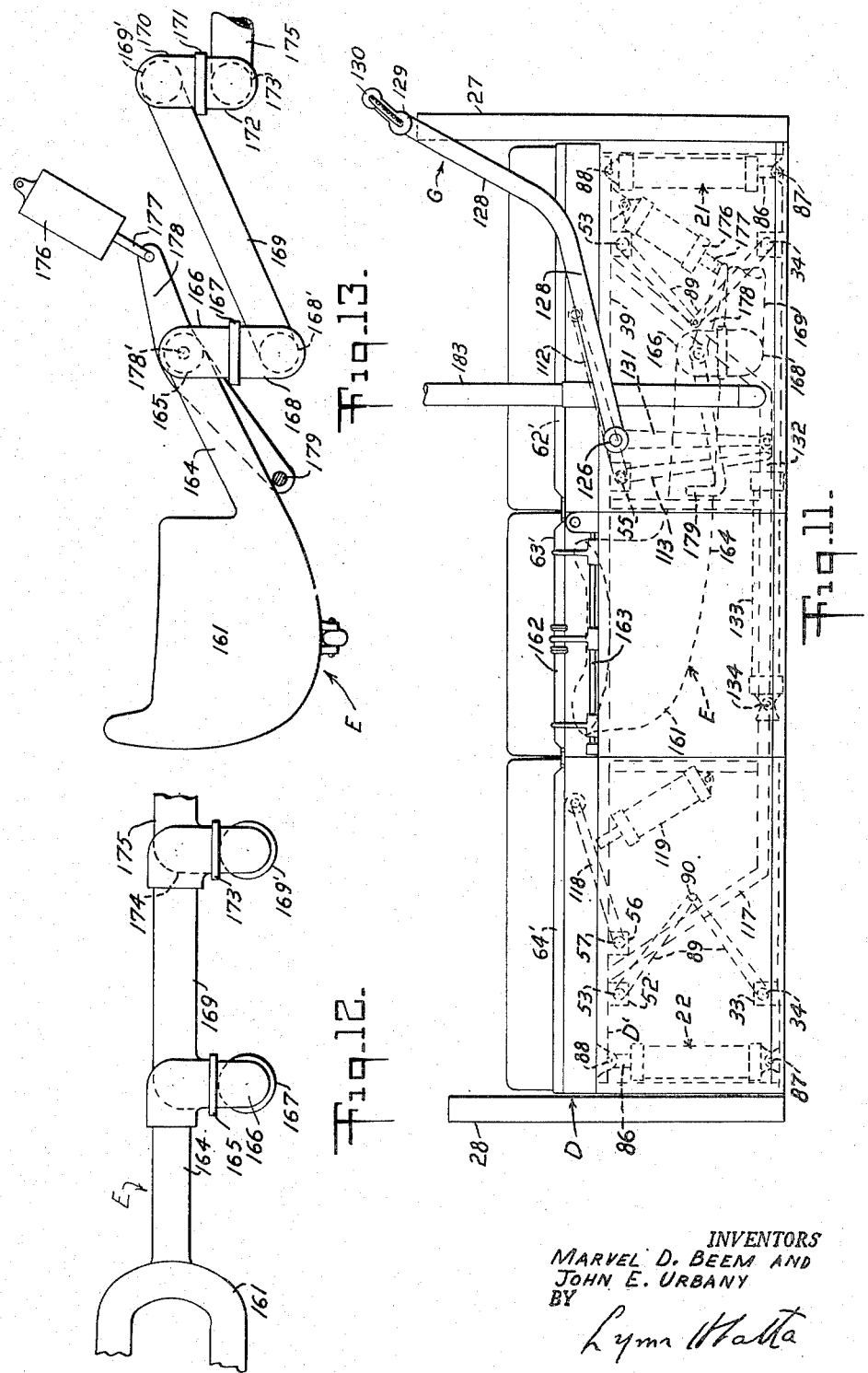
INVENTORS
MARVEL D. BEEM AND
JOHN E. URBANY
BY
Lynn Walla
ATTORNEY

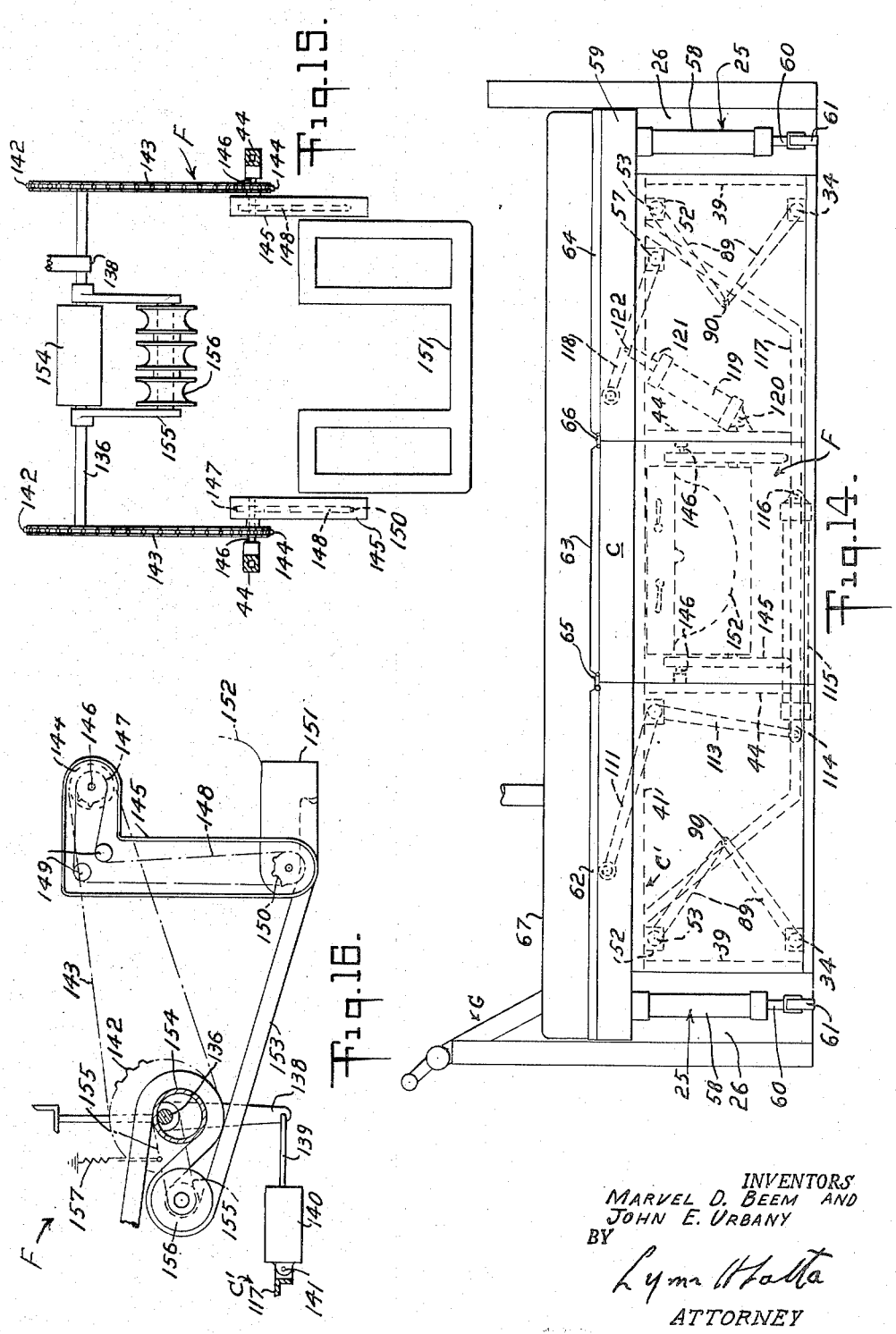

United States Patent Office 2,699,772
Patented Jan. 18, 1955

2,699,772

MECHANIZED BED

Marvel D. Beem and John E. Urbany, Los Angeles, Calif.; said Urbany assignor to said Beem Application May 5, 1948, Serial No. 33,064

9 Claims. (Cl. 128—33)

This invention relates to mechanized beds. While it is particularly adaptable to hospital beds, the invention is also useful in connection with beds for invalids, for home use, and for any other use in which mechanization may be desirable. It will therefore be understood that where reference is made to hospital beds, it is intended to refer generally to a mechanized bed for any such use. The general object of the invention is to provide a mechanized bed having a number of power operated facilities together with a fingertip control through which either an attendant or the patient himself may control the operation thereof.

One of the specific objects of the invention is to provide a mechanized bed having a bottom that is adjustable to various levels. This feature of the invention will be referred to as the high-low bed feature.

Another object of the invention is to provide a mechanized bed having improved mechanism for providing what is known as the "Trendelenberg" position, or the "reverse Trendelenberg" position. A further object is to provide an arrangement in which the Trendelenberg and reverse Trendelenberg positions are actuated through the same mechanism that actuates the "high-low" bed feature. A still further object is to provide an improved arrangement in which the Trendelenberg mechanism can be controlled in such a manner as to provide for oscillation of the main bed bottom around a transverse axis intermediate the head and foot thereof, so as to provide blood vessel pressure variation by oscillation, as employed in the treatment of certain types of heart and arterial disorders. Another object is to provide a mechanized bed having such a Trendelenberg arrangement, in which the so-called "Fowler Trendelenberg" position may be attained. This is the position in which, in addition to a general overall tilting of the bed bottom, there is a raising of the back rest and a slight raising of the knee joint so as to produce a more natural body position while maintaining the body nevertheless in the generally inclined position.

Another object of the invention is to provide a hospital bed having a main bottom that is normally a part of the bed and has a back-rest and knee joint adapted to be elevated thereby, in an in-the-bed operation; which is adapted to be raised and lowered bodily in connection with the high-low bed feature; and which is adapted, when in the high position, to become supported upon transporting mechanism by means of which it may be moved out of the bed and wheeled to any part of a hospital to which it may be desired to transport the patient. In this connection, the invention has as a further object to provide a mechanized bed embodying non-mobile mechanism for performing all of the powered operations, together with a mobile unit which is actuated by such mechanism while in the bed, and is adapted to be bodily wheeled out of the bed when in an elevated position.

More specifically, the invention contemplates a mobile unit comprising a main bed bottom equipped with independent transporting means adapted to support the same in any selected position of vertical adjustment, together with elevating mechanism which remains a part of the non-mobile structure of the bed, and which may be retracted after having elevated the main bed bottom to a position in which the bottom may clear all of the mechanism of the bed as it is wheeled out of the bed. The invention in this connection contemplates an arrangement in which the elevating mechanism, e. g., the Trendelenberg mechanism, may be employed to elevate the main bed bottom to a height in which it will clear the remaining mechanism of the bed, may then be retracted to permit the main bed bottom to be wheeled out of the bed, to be again elevated so as to pick up the main bed bottom when the mobile unit (the main bed bottom with its independent wheeled supporting means) returns to the bed, may subsequently lower the main bed bottom back to its normal position in the bed, and, after the mobile supporting means has been locked in the low bed position, may subsequently pick up the mobile unit bodily for high-bed position, Trendelenberg operation, etc.

A further object in this connection is to provide, in the mobile unit, means for locking the main bed bottom with reference to the mobile supporting mechanism, at various positions of vertical adjustment, in order that it may be supported in a high position or transportation away from and back to the bed, and with its supporting mechanism retracted for normal in-the-bed operations.

A further object of the invention is to provide a mechanized bed embodying a power actuated trapeze that is so arranged as to be coordinated with and not to interfere with the other mechanisms of the bed, including the mobile unit.

A further object of the invention is to provide, in a mechanized bed having the high-low feature specified above, an arrangement whereby all of the mechanized operations of the bed can be carried out irrespective of the level to which the bed has been adjusted. Specifically, the invention contemplates mechanism for elevating the back rest and the knee joint; mechanism for elevating and lowering the lavatory; mechanism for elevating and lowering a toilet facility; and a mechanized trapeze, all operable in any position of elevation of the bed. To be more specific, the invention contemplates a bed having a main bed bottom and a toilet unit bottom arranged alongside the main bed bottom, both operable for elevation and lowering simultaneously, at any position of vertical adjustment of the bed, and with the main bed bottom forming part of a mobile unit which can be wheeled out of the bed. This coordination of functions is attained by providing an intermediate, movable frame on which all of the bed mechanism including the toilet unit and the main bed bottom (mobile unit), together with trapeze, lavatory, and mechanism for actuating the toilet, lavatory, trapeze, and the two bed bottom units, is carried. This intermediate frame is in turn connected to a stationary frame (which is adapted to be permanently fastened to the floor of a building where desired) through the medium of elevating mechanism which provides both the high-low bed adjustment and the Trendelenberg, reverse Trendelenberg and oscillation operation.

Another object of the invention is to provide a mechanized bed embodying an improved retractable toilet facility embodying a toilet bowl mounted for elevation from a retracted position concealed beneath the bed to a position presented to an access opening in the bed bottom of the toilet unit, and vice versa; or from a normal in-the-bed lowered position to a position swung transversely out of the bed, for use by an ambulatory patient. In this connection, the invention provides a number of improvements upon the toilet mechanism shown in the prior applications of Marvel D. Beem, Serial No. 545937, filed July 21, 1944, abandoned June 23, 1949, and Serial No. 603,037, filed July 3, 1945, now issued as Patent No. 2,500,738, and in particular, provides for accommodating the movement of the bowl to any position of elevation or angularity that may be assumed by the thigh section (intermediate section of the bottom) of the toilet unit. The invention also provides improvements in a retractable cover for the opening in the thigh section of the toilet unit.

Other objects will become apparent in the ensuing specifications and appended drawings in which:

Fig. 3 is a toilet-side view of the bed, showing, in broken lines, the toilet and lift and trapeze mechanisms in extended (elevated) positions;

Fig. 4 is a plan view of the bed bottom apparatus, apart from the fixed frame structure;

Fig. 5 is a foot-end view of the bed, showing roll-away operation of the mobile unit;

Fig. 6 is a lavatory-side view of the bed, in the "high bed" position;

Fig. 7 is a head-end view of the bed;

Fig. 8 is a schematic view of the high-low bed operating mechanism;

Fig. 11 is a toilet-side view of the bed, showing all mechanism in retracted positions;

Fig. 12 is a plan view of the toilet mechanism;

Fig. 13 is a side view thereof;

Fig. 14 is a lavatory side view of the bed, in the "low bed" position;

Fig. 15 is a plan view of the lavatory mechanism; and

Fig. 16 is a sectional view of the lavatory mechanism, taken transversely of the bed.

We will now proceed to describe the details of construction of the bed, commencing with the generalized description of the bed as a whole, under the heading

*General description of the bed*

Figure 1:
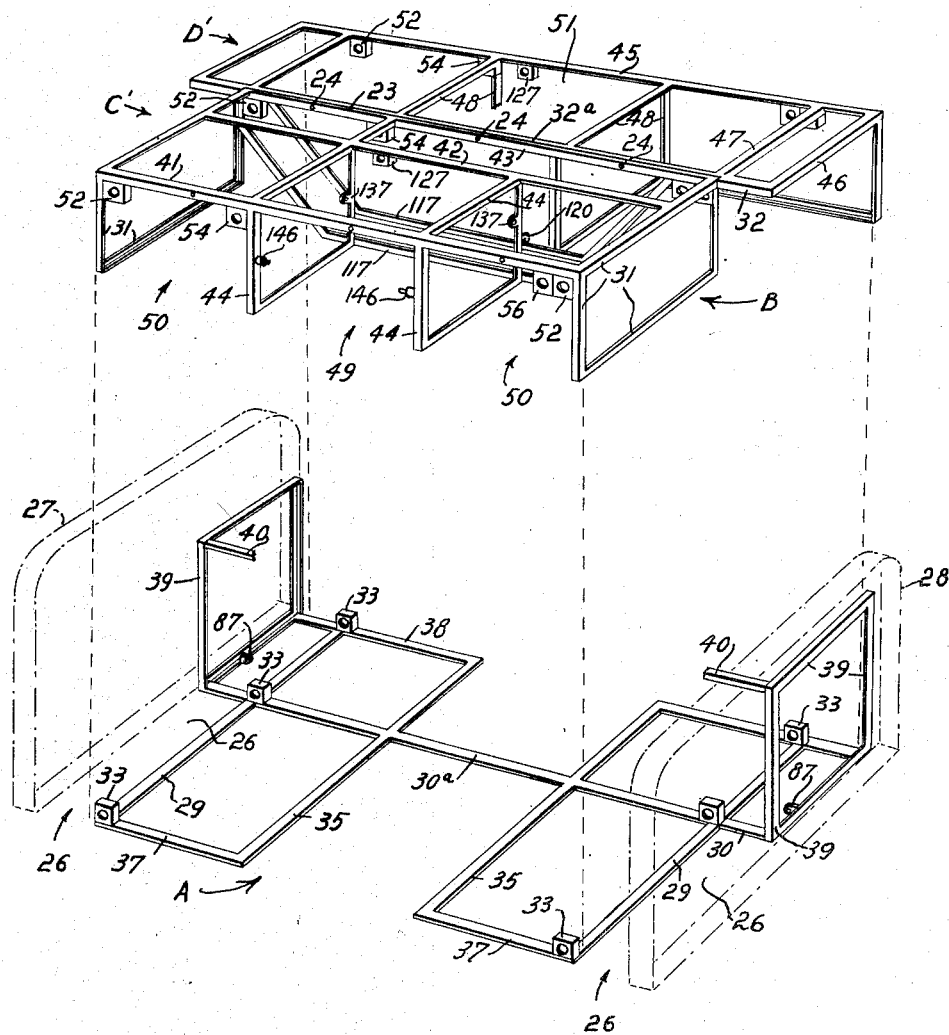
Fig. 1 is an exploded isometric view of the bed frames.
Figure 2:
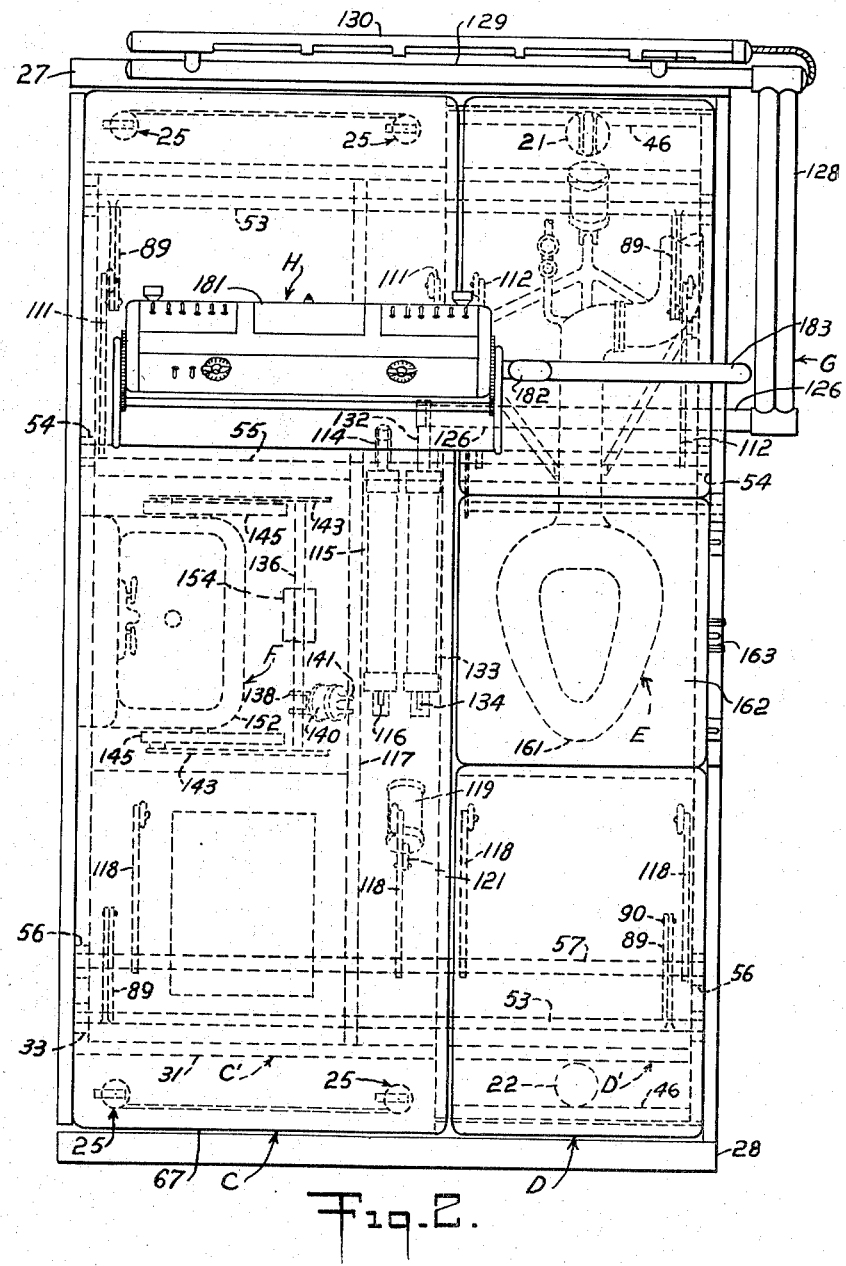
Fig. 2 is a plan view of the bed.

Referring now to Figs. 1, 2, and 3, the bed embodies a base frame A which, after the bed has been installed, remains permanently in a fixed position. Ordinarily, the frame A will be fastened to the floor of the building in which the bed is installed. The mechanism of the bed is carried by an intermediate, or Trendelenberg frame B, which executes most of the motions required of the bed. A main bed bottom C (Fig. 2 and Fig. 4) is supported upon one side of the intermediate frame B (upon a section C' thereof shown in Figs. 1 and 14) and a toilet unit bottom D is supported upon the other side of the intermediate frame B (upon a section D' thereof, shown in Figs. 1 and 11).

The intermediate frame B is supported by an actuator at either end of the bed. These two actuators, for the purpose of illustration, have been shown as comprising hydraulic servo-motors which are indicated at 21 and 22 respectively in Figs. 3, 2, 7, 11, and 14.

The invention provides interlocking control mechanism for the actuators 21 and 22, which control mechanism is so operable as to provide for elevating the intermediate frame B to (a) high bed position, (b) Trendelenberg position, (c) reverse Trendelenberg position, and to any intermediate position of elevation or inclination, and to permit the retraction of the intermediate frame B from any of these positions to the normal low bed position which is shown in Figs. 3, 7, 11, 14. The operations of the actuators 21 and 22 may also be controlled in such a manner as to produce the oscillation operation, in which first the head end of the intermediate frame is raised while the foot end remains in the low position, and subsequently the head end is lowered and the foot end raised while the head end remains in the low position.

The frames A and B are so constructed that it is possible to assemble them into either a right-handed bed or a left-handed bed. In making such a conversion, there is no change whatever in the base frame A. The intermediate frame B, however, comprises two separable units C' and D' which are separable along the line 23 of Fig. 1 and are bolted together as at 24. In the drawings the right-hand bed assembly is shown. To achieve the left-hand bed assembly, it is only necessary to separate the frames C' and D', to secure that side of the section C' which is the outer side in Fig. 1 to that side of the section D' which is the outer side in Fig. 1, and to turn the reassembled intermediate frame B end for end from the position shown in Fig. 1, mounting the section D' in the left side of the fixed frame A as viewed in Fig. 1 and the section C' in the right side of the fixed frame as viewed in Fig. 1. All of the mechanisms carried by the sections C' and D' remain in their same relation to those sections as that which is shown and will subsequently be described hereinafter.

In all of its positions, the intermediate frame B carries the following components: (a) a toilet facility E (Figs. 2, 3, 12, 13) which is carried directly below the toilet unit bottom D; (b) a lavatory facility F (Figs. 2, 14, 15 and 16) which is carried normally beneath the central portion of the main bed bottom C and may from that position be elevated to a position extending upwardly alongside the outer side of the bottom C or above the central portion thereof; (c) a trapeze G which is carried by the toilet unit portion D' of the intermediate frame B (Figs. 2 and 3) and a control unit H which is likewise carried by the section D'.

The frame B also carries the individual actuators for the toilet unit E, the lavatory unit F, the trapeze unit G, and the lifts for the articulated sections of the bed bottoms C and D, all as will be more particularly described hereinafter.

The main bed bottom C is incorporated in a mobile unit which includes the bottom C and four retractable leg units 25 (Figs. 1, 2, 5, 6, and 14). The leg units 25 are receivable in spaces 26 in the base frame A, which spaces are defined between the headboard 27 and footboard 28 respectively forming a part of the fixed frame A, and frame numbers 29 and 30 of the fixed frame and frame numbers 31 and 32 of the intermediate frame B. The main bed bottom C, when raised to the high bed position and supported in that position by the extension of the leg units 25, may be wheeled out of the bed upon the wheeled leg units 25, sliding out of the recesses 26 which are opened at the side of the bed.

Having given a general description of the bed, we will now proceed to describe in detail the

*Frame structure*

Referring now to Fig. 1, the base frame A may embody any suitable structure which provides for fixedly supporting the head board and foot board 27 and 28 in spaced relation to the main central portion of the frame to provide the recesses 26, and for supporting bearings 33 in which are journalled a pair of torque tubes 34 (Figs. 2, 3, 5, 6, 14) forming part of the transverse levelling mechanism. A suitable structure for the frame A is a central longéron 30a of which the frame members 30 are extensions; spaced pairs of transverse bars 35 and 29, side bars 37 and 38 connecting the ends of the bars 35 and 29; and upright end frames 39 to which the head board 27 and foot board 28 are respectively secured. The frame A may also include a tie bar 40 connecting the inner corners of the end frames 39, to secure these frames rigidly in their upright positions.

The intermediate frame B is so formed as to cooperate with the frame A in defining the recesses 26, and to support a number of bearings for the actuating mechanism hereinafter to be described. To this end, the frame B may include, in the section C', longérons 41, 42, and 43 and four upright frames 31 and 44 arranged in transverse vertical planes and extending downwardly from the lonlongérons 41—42, and in the section D', longérons 45 and 32a (of which the members 32 constitute continuations beyond the frames 31), transverse bars 46, 47, and transverse frames 48 extending downwardly from the longérons 32a, 45.

Between the frames 44 there is defined a lavatory space 49, and between the respective frames 31 and 44 are spaces 50 which may accommodate linen cabinets, etc., and will be referred to as utility spaces. Between the frames 48 is defined a space 51 which accommodates the bowl portion of the unit E and the immediate connection to the operating mechanism thereof.

Secured to the frame B are bearings 52 in which are mounted torque tubes 53 of the transverse leveling mechanism; bearings 54 in which is mounted the torque tube 55 of the head lift mechanism; and bearings 56 in which is mounted the torque tube 57 of the knee lift mechanism (Figs. 2, 3, 6, and 14).

We will next describe the

*Mobile unit*

This unit comprises the main bed bottom C and the retractable-extensible leg units 25 on which it is supported. The leg units 25 include hydraulic actuator devices each comprising a cylinder 58 attached at its upper end to the lower side of the frame 59 of the main bed bottom C, and a piston 60' which operates a piston rod 60, to the lower end of which is pivoted a caster 61.

Mounted upon the mobile unit frame 59 are the conventional raisable, articulated head rest, thigh and leg rest sections 62, 63, and 64 respectively, the head rest 62 and thigh section 63 being hinged on a common hinge 65 to the frame 59 and the thigh section 63 and leg rest 64 being hinged together by a knee hinge 66, which is adapted to be elevated from its normal position resting against the frame 59. The head rest 62, thigh section 63 and leg rest 64 cooperatively support a flexible mattress 67 which may be, for example, of sponge rubber, although it could be of a flexible type of same construction adapted to bend at the hinges 65 and 66.

When the mobile unit is in the bed, the head rest 62 and knee joint 66 are adapted to be raised by the lift mechanism that will be described hereinafter. In the high-bed position of the bed bottom C, it will clear this lift mechanism so that the mobile unit may be wheeled out of the bed. In the low-bed position and in all intermediate positions in which it is being elevated or lowered, the main bed bottom C rests upon the section C' of the intermediate frame B. From the high bed position, however, the main bed bottom C is adapted to derive supplementary support from the extensible leg units 25 which embody hydraulic lock mechanism that will presently be described, whereby the intermediate frame B may be lowered sufficiently to permit the clearance by the main bed bottom C of all of the mechanism of the intermediate frame B.

Figure 10:
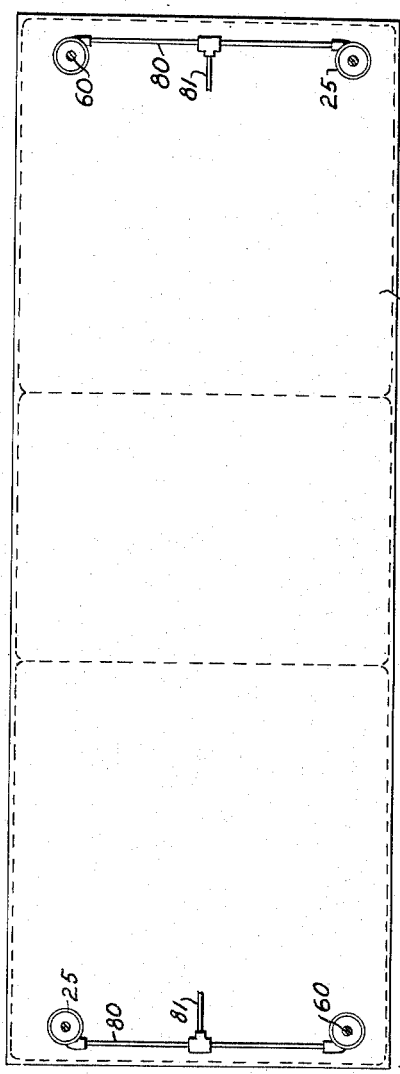
Fig. 10 is an inverted plan view of the same, with the supporting legs shown in section.
Figure 9:
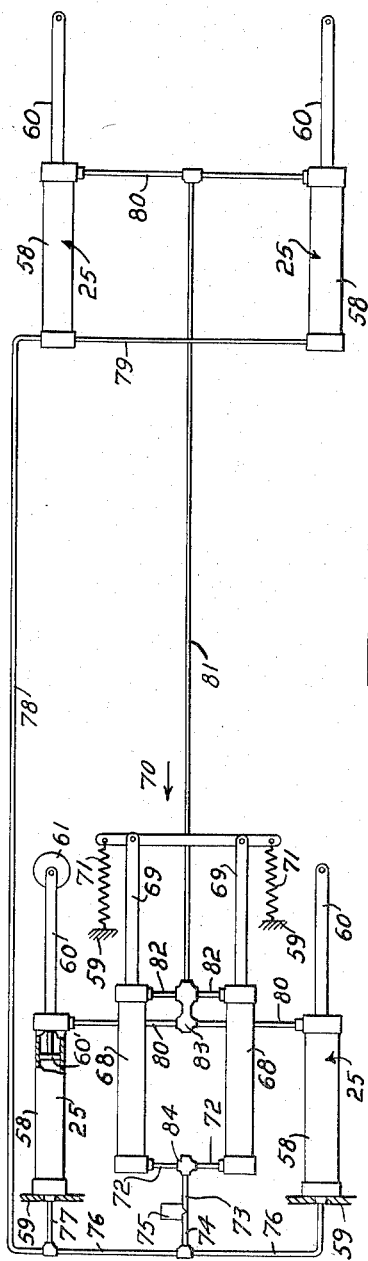
Fig. 9 is a schematic view of the mobile unit supporting mechanism.

Referring now to Figs. 9 and 10, the hydraulic system of the mobile unit includes the four hydraulic leg units 25 together with an accumulator which may comprise one or more cylinders 68 having a piston or pistons operating a piston rod or piston rods 69 which are loaded, in the direction indicated by arrow 70, by either hydraulic pressure or by means of spring 71 (which is shown merely for illustrative purposes) the springs 71 being anchored to a fixed part of the frame 59 as indicated schematically.

The loading 71 operates, when permitted to do so, to force fluid out of the cylinders 68 through lines 72, 73, solenoid valve 75, and lines 74, 76, 77, 78, 79 into the upper ends of each of the cylinders 25. Simultaneously, fluid will be drained from the lower ends of the respective cylinders 58 through lines 80, 81, 82, and 83 to the lower ends of cylinders 68. This operation will take place when the load of the main bed bottom C is taken from the legs 60 by the elevating operation of the high-low bed mechanism. In this operation, the valve 75 is opened to permit flow from line 73 to lines 74 and 76. For example, if the switch which controls the solenoid valve 75 is pressed to the "cut-off" position as the mobile unit is being elevated, the wheels 61 will remain in contact with the floor as the main bed bottom is elevated. When the bottom C reaches its fully elevated position, the solenoid valve 75 will be deenergized, locking the system so that fluids cannot flow, and thereby providing a fluid lock for locking the legs 60 in their extended positions so that the mobile unit may be supported thereon and wheeled out of the bed.

In the reverse operation, the weight of the main bed bottom is utilized to force the fluid in the operation through the system, against the resistance of the loading means 71. This will occur while the auxiliary frame B is being lowered after the mobile unit has been returned into the bed. In this retracting operation, fluid flows from the upper ends of cylinders 25 through lines 77, 76, 74, valve 75, and line 73, to junction 84 from which it is distributed, into accumulator cylinders 68 through lines 72, while the fluid expelled from the lower ends of cylinders 68 flows into the bottom ends of cylinders 25 through lines 80, 81, and 82 and fitting 83. In this operation, the solenoid valve is again opened. At the end of the retracting operation, the valve 75 will again be closed. The legs 60 may thus be locked either in the extended or retracted positions for the purposes previously mentioned.

The elevating and lowering of the main bed bottom C is handled by the high-low bed mechanism.

*High-low bed mechanism*

As previously stated, elevation of the intermediate frame B is effected by the operation of hydraulic actuators 21, 22, each of which comprises a cylinder 85 and a piston therein operating a piston rod 86. Piston rod 86 of actuator 21 is pivoted at 87 to a respective end cross member 39 of fixed frame A. The closed end of cylinder 85 of actuator 21 is pivoted, at 88, to a respective end member 46 of intermediate frame B. Actuator 22 is similarly connected by pivots 87 and 88 to frame 39 and end member 46, respectively. It may be noted at this point, referring to Figs. 5 and 7, that the actuator units 21, 22 are located at the centers of the end frames 39 and of the ends of frame section D' of intermediate frame B. This is to provide for accommodation of the mobile unit supporting devices 25 in the end spaces 26 opposite the ends of frame section C'. Since the lift is thus applied to the intermediate frame B at points located near one side thereof, it is essential that means be provided for maintaining transverse leveling of the intermediate frame. Such transverse leveling mechanism comprises the lower torque tubes 34, the upper torque tubes 53, disposed immediately above the torque tubes 34, and toggle linkage comprising arms 89 fixed to the respective torque tubes 34 and 53 and pivoted together at 90. The toggle linkage on one side of the bed, forced to spread as the result of upward movement of the torque tubes 53 on that side, will be transmitted through the torque tubes 53 to the toggle linkage on the other side of the bed which will spread in unison with the first mentioned toggle linkage, thereby causing the other side of the bed to raise in unison with the side to which the lifting power is applied. Thus lateral leveling is accomplished.

Longitudinal leveling is accomplished hydraulically through the mechanism shown schematically in Fig. 8. Such mechanism comprises a pump 91, drawing liquid from a reservoir 93; a line 94 leading through a check valve 95 and a solenoid valve 96 and a line 97 to the lower side of one of the actuators 21, 22. By way of example, the drawings show the line 97 leading to actuator 22, from the upper end of which a line 98 leads to the lower side of actuator 21. The net cross-sectional area of the upper side of actuator 22 (of the fluid space therein) is so related to the cross-sectional area of the lower end of actuator 21, that the fluid displaced from the upper end of actuator 22 will effect the upward movement of the piston of actuator 21 at the same lineal rate as the upward movement of the piston of actuator 22 which causes such displacement. Thus the entire elevating force is applied first to the lower end of actuator 22 and a percentage thereof (whatever is necessary to carry the loading upon actuator 21) is transferred from the upper end of actuator 22 to the lower end of actuator 21, and the resulting upward movement of the intermediate frame B must necessarily be a movement of both ends upwardly at the same rate.

From the line 98, a fluid line 99 leads to a line 100 from which fluid may return through a solenoid valve 101 and lines 102 and 103 to the reservoir 93.

From the outlet of pump 91, another feed line 104 leads through a check valve 105 and a solenoid valve 106 to the line 100 which constitutes a junction between valves 106 and 101.

From the line 97, a junction line 107 leads through a solenoid valve 108 to return line 103. The line 107 constitutes a junction between line 97, and valve 96 and line 94.

The operation of the intermediate frame elevating mechanism for the high-low bed operation is as follows: the operator, by pressing the "high-bed" switch, will energize solenoid valve 96 to the open position and simultaneously initiate the operation of motor driven pump 91 to feed liquid through line 94, check valve 95, solenoid valve 96, and line 97 to the lower end of actuator 22, forcing the piston thereof upwardly and forcing fluid from the upper end of actuator 22 into the lower end of actuator 21 as previously set forth. The upper side of actuator 21 is vented. Line 99 will be blocked off as the result of both valves 101 and 106 remaining closed. When the "high-bed" switch is released to neutral position, the valve 96, which is a self-closing valve, will be deenergized so as to automatically close, locking the entire system and maintaining the raised position of the frame B. To lower the intermediate frame, the "low-bed" switch is actuated to open valve 108, whereupon the weight of the intermediate frame and the parts carried thereby will force the piston rod 86 downwardly, forcing fluid from the lower end of actuator 22 through line 97, valve 108, and line 103 back to reservoir 93. At the same time, fluid from the lower side of actuator 21 will be forced through line 98 back to the upper side of actuator 22 (line 99 remaining blocked off).

We will now describe the operation of the intermediate frame elevating mechanism for

*Trendelenberg and reverse Trendelenberg and oscillating operations*

For Trendelenberg operation, closing of the "Trendelenberg" switch will simultaneously energize both valves 96 and 101 to open positions, and energize pump 91 whereupon fluid will be pumped through line 94, check valve 95, solenoid valve 96, and line 97 to the lower side of actuator 22, raising the foot of the intermediate frame B while fluid from the upper side of actuator 22 is by-passed back to reservoir through lines 98 and 99, valve 101 and return line 103. Because of this by-passing of the fluid from the upper end of actuator 22, the actuator 21 remains deenergized.

For returning the frame from the Trendelenberg position back to normal low-bed position, valves 101 and 108 are energized to the open position by pressing the "return Trendelenberg" switch. Fluid will then be forced from the lower end of actuator 22 through lines 97 and 107, valve 108, and return line 103 to reservoir 93. The opening of valve 101 assures the refilling of the upper end of actuator 22 by the diversion from return line 103 through valve 101, to line 99, of sufficient fluid to effect that purpose.

For reverse Trendelenberg operation, the operator presses the "reverse Trendelenberg" switch to energize valve 106 to the open position, valves 96, 108, and 101 remaining closed, and to simultaneously energize pump 91, whereupon fluid will be forced from pump 91 through line 104, check valve 105, solenoid valve 106 and lines 100 and 99 to the lower end of actuator 21. Line 98 conveys fluid from line 99 to the upper end of actuator 22 to fill the same, if necessary, and to assure actuator 22 remaining inoperative. The actuator 21 will thereupon raise the head end of the intermediate frame B, the foot end remaining in the low-bed position.

For returning from the reverse Trendelenberg position, valve 101 is energized to the open position by pressing the "down-reverse Trendelenberg" switch, valves 96, 106, and 108 remaining closed, and thereupon fluid will be forced out of the lower end of actuator 21 through lines 99, 100, 102 and 103 to reservoir 93.

For the oscillation operation, an electric timer (not shown) is operated to automatically energize valves 96, 101, 106 and 108 in the proper sequence to effect, first, Trendelenberg operation, then return Trendelenberg operation, then reverse Trendelenberg operation, and, finally return reverse Trendelenberg operation as described above, with continuing repetition of this sequence.

It will be understood that in all cases where it has been stated above that a particular valve or pair of valves is energized to effect a particular operation, that the remaining solenoid valves of the group 96, 101, 106, 108, remain closed. It is also to be understood that whenever a given energizing switch is released back to the neutral position, the solenoid valve or valves previously opened thereby will thereupon be closed.

We will now describe the construction and operation of the

Head and knee lift

Mounted in bearings 54 is the torque tube 55 to which are affixed two pairs of arms 111 and 112 (Fig. 2) for the head rests of bed bottom units C and D respectively. It may be noted at this point that the bed bottom unit D embodies head rest, thigh, and leg rest sections 62', 63' and 64' corresponding to the sections 62, 63 and 64 respectively of the bed bottom C (Fig. 3). A power transmitting arm 113 (Fig. 14) is secured to and projects downwardly from torque tube 55, and its lower end is connected to piston rod 114 of the hydraulic actuator including rod 114 and a cylinder 115, the closed end of which is pivoted at 116 to truss portion 117 (Figs. 14 and 1) of intermediate frame section C'. Since the actuator 114, 115 is carried by the intermediate frame, it will always be in position to actuate the head lifts, irrespective of the position of elevation of the bed. The actuator 114, 115 is adapted to shift the arms 111, 112, from lowered position shown in dotted lines in Fig. 3, to raised positions shown in dot and dash lines in Fig. 3. The ends of the arms 111, 112 carry rollers which act against suitable bearing surfaces on the under sides of head rest sections 62, 62', which will thereby be elevated to positions such as those indicated in the dot and dash lines in Fig. 3.

Journalled in bearings 56 is the knee lift torque tube 57 to which are secured two pairs of arms 118 for elevating the knee joints 66 of the bed bottoms C and D. A knee lift actuator comprises a cylinder 119 pivoted at 120 to a frame member 44 of intermediate frame B, and a piston rod 121 which is pivoted at 122 directly to one of the arms 118. The operation of the knee lift is similar to that of the head lift, both knee lifts being actuated simultaneously, when actuator 119 is energized (and both head lifts being actuated simultaneously when actuator 115 is energized).

It will be understood that the knee lifts and head lifts may be actuated independently of each other, there being a "head lift" control switch for energizing a solenoid valve for feeding fluid to actuator 115 and there being a "knee-lift" switch for energizing a solenoid for feeding fluid to actuator 119. The actuating liquid in each case comes from the pump 91.

It may be noted at this point that the high-low bed actuators 21, 22 are adapted to raise the intermediate frame B to a sufficient height to allow the mobile unit to be wheeled out of the bed, clearing the rollers at the upper ends of arms 111 and 118 when the intermediate frame B has been lowered to low bed position.

We will now describe the construction and operation of the

Trapeze mechanism

Referring now to Figs. 1, 2, 3, 7, and 11, we provide a trapeze torque tube 126 which is journalled in bearings 127 carried by frame bars 42 and 45 respectively. The torque tube 126 thus lies immediately below the top of frame section D' and its outer end projects beyond the outer side of this frame section and has secured thereto the trapeze arm 128. To the free swinging end of arm 128 is rigidly secured the trapeze bar 129, which carries an ultraviolet lamp unit 130. The unit 130 may also incorporate therein a fluorescent reading lamp.

A power transmitting arm 131 is fixed to the torque tube 126 at its inner end, and projects downwardly. To the lower end of the arm 131 is linked the piston rod 132 of a trapeze actuator which includes piston rod 132 and hydraulic cylinder 133 pivoted at 134 to a connection between truss members 117.

By pressing a "trapeze" switch, the operator may cause the energization of a solenoid valve which feeds fluid from pump 91 into actuator 132, 133, causing the same to extend and move arm 131 counterclockwise as viewed in Fig. 3, thereby swinging arm 128 upwardly from its full line position shown in Fig. 3 to its extended position (not shown). The arm 128 has a swing of approximately 70°. In its down position, it maintains the trapeze bar 129 in a position immediately above the headboard 27 and in its raised position, it supports the bar 129 approximately above the hinges 65. The broken line position shown in Fig. 3 is a position approximately half way between the lowered and the fully raised positions.

Since the trapeze bar is supported entirely from one side, it leaves, on the main bed side of the bed, a fully open space through which the mobile unit may be moved.

The trapeze bar 129 is made use of by a patient in moving himself from a position resting upon the main bed bottom to a position resting upon the toilet unit bottom, and vice versa.

We will now describe the construction and operation of the

Lavatory mechanism

Referring now to Figs. 1, 2, 6, 14, 15 and 16, we provide, in the lavatory mechanism, a torque tube 136 which is journalled in bearings 137 on frames 44 of movable frame section B. An arm 138, secured to torque tube 136 and projecting downwardly (Figs. 2 and 16), is linked to piston rod 139 of a lavatory actuator including rod 139 and a cylinder 140 which is pivoted at 141 to truss 17 of frame section C'.

A pair of sprockets 142, secured to respective ends of torque tube 136, drive chains 143, which in turn drive a pair of sprockets 144 which are fixed to a pair of bell crank arms 145. The bell crank arms 145 are mounted for free swinging movement upon pivot studs 146 which are fixed to the outer parts of frame members 44 of frame C'. Sprockets 147 are fixed to the inner ends of studs 146 and thus are in fixed relation to the frame. Chains 148 are trained around sprockets 147, around idlers 149 at the elbows of bell crank arms 145, and around sprockets 150 which are fixed to a lavatory bracket 151. The ratio of sprockets 147 to sprockets 150 is 1:1, whereby these two sprockets will constantly remain in fixed angular relation to each other, and whereby bracket 151, having been initially set in a horizontal position, will maintain such horizontal position throughout an arc of swing of arms 145 from a completely retracted position (shown in full lines in Fig. 16) to an extended position 180° removed counterclockwise from such retracted position as viewed in Fig. 16. The rotation of the arms 145 is brought about by movement transmitted from actuator 139, 140 through arm 138, sprockets 142 and chains 143 to sprockets 144 which, as previously stated are fixed to the arms 145. A lavatory bowl 152 is supported by bracket 151.

Three fluid lines 153, including hot and cold water supply and drain, are connected to the lavatory bowl 152 through a pay-out mechanism which includes a tubular roller 154 suspended on torque tube 136, arms 155 each having one end journalled on torque tube 136, and idler pulleys 156 carried by the swinging ends of arms 155. The arms 155 are spring loaded (as indicated at 157) to retracted positions, and yield downwardly and outwardly as the bowl 152 is swung upwardly and outwardly.

We will now describe the

Toilet mechanism

The toilet mechanism E includes a toilet bowl 161 which is disposed below an opening in thigh section 63′ and is adapted to have its mouth portion move upwardly through that opening. The opening is normally closed by a cover 162 which is hinged at 163 to the thigh section 63′. The bowl 161 has an outlet neck 164 which is connected by a swivel 165 on a transverse horizontal axis to an elbow 166 which extends transversely toward the outer side of the bed and which is pivoted on a vertical axis, through a swivel joint 167, to an elbow 168. Elbow 168 is connected through a swivel 168′ on a horizonal axis below swivel 165, to a drain tube 169. The end of drain tube 169 is connected through a swivel 169′, on a horizontal axis, to a downwardly extending elbow 170 which is pivoted through a swivel joint 171, on a vertical axis, to an elbow 172 which extends transversely toward the center of the bed. The elbow 172 is pivoted through a swivel joint 173 on a transverse horizontal axis to an elbow end 174 of a tube 175 which constitutes a fixed part of the plumbing of the building in which the apparatus is installed.

A toilet bowl actuator 176 has its movable element 177 pivoted at 178′ to the rear end of a pick-up yoke 178 which is fulcrumed at the axis of swivel 165. The forward end of yoke 178 projects below the neck 164 and has a transverse bearing part 179 which makes contact engagement with the lower side of neck 164 (or bowl 161) to raise the bowl when actuator 177 is extended. This may be accomplished by depressing a "bowl-elevation" switch to operate a solenoid for controlling actuator 176.

It may be noted at this point that elbow 166 forms a bend in the discharge line including neck 164, which bend is such that the bowl 161 may be swung horizontally out from beneath the bed, with the discharge line clearing the vertical frame member 48 by cradling the member 48 in the corner of the bend between neck 164 and elbow 166, the bowl swinging from the vertical axis of swivel 167. To provide for clearance of frame member 45, the intermediate frame B is elevated to or toward the "high bed" position.

The neck 164 is inclined upwardly and rearwardly to form, with elbows 166 and 168, a water seal such as to permit proper flushing of the bowl and the sealing of sewer gases in any of the positions of elevation thereof. This has been a distinct problem in the development of the invention, previous models having failed to solve this problem.

The discharge tube 169 is also inclined upwardly and rearwardly and is connected to plumbing 175 through the triple swivel assembly 169, 171, 174, in order to provide for payout or longitudinal extension or contraction between swivel points 174 and 165 in high-low bed operation. In this connection it may be noted that the fulcrums 178′ are carried by the intermediate frame B so that the axis 165 moves upwardly and downwardly with intermediate frame B. During such vertical movement of axis 165, secondary transverse horizontal swivel 168′ will provide for pivotal movement between tube 169 and elbow 166.

Control panel and tray

A control panel 181 (Fig. 7) is mounted, through a double vertical axis swivel 182) on the upper end of an arm 183 the lower end of which is connected through a swivel 184 to a post 185 carried by the fixed bed frame A. The tray 186 is mounted for vertical swinging around the horizontal, longitudinal axis 187 of control panel 181.

We claim:

1. In a mechanized bed: a base frame adapted to rest upon a floor surface and to be secured thereto; an intermediate frame above said base frame; said base frame and intermediate frame each including a first side portion extending the full length of the bed and having projecting ends, and a second side portion having ends recessed toward one another from said projecting ends; head and foot members mounted on said projecting ends of the base frame and extending laterally therefrom in spaced relation to the recessed ends of both frames to define clearance spaces, said clearance spaces being open at the side of the bed and extending vertically from said floor surface to the top of said intermediate frame; a patient transporting cart member including a top frame, respective leg members projecting downwardly from the ends thereof, and floor engaging roller supports on the respective leg members, said cart member being normally positioned with said leg members and roller supports received within said clearance spaces and with said top frame disposed above said second side portion of the intermediate frame; power operated means carried by said base frame for raising said intermediate frame so as to engage said top frame and support said cart as a functional part of the complete bed; said top frame of the cart member and the first side portion of the intermediate frame having mattress-supporting means, positioned in side by side relation in a common plane when said cart is thus supported by the intermediate frame and adapted when mattress covered to cooperatively provide a patient supporting surface, said cart being adapted, in a lowered position of said intermediate frame, to be supported by said floor surface so that it may be wheeled out of the bed.

2. A bed as defined in claim 1, wherein said legs are extensible, each including a part fixed to said top frame and another part having a longitudinally slidable guided connection with said fixed part, the respective roller support being mounted on the lower end of said other part; said legs being further provided with means preventing relative longitudinal movement between said other parts and the respective fixed parts so as to support the top frame from said roller supports with the legs in extended condition.

3. A bed as defined in claim 2, wherein said cart member includes means to maintain contact of said roller supports with said floor surface while the top frame is being raised, and wherein said preventing means is operative to secure the legs against extension so that said other leg parts may be normally suspended from said top frame in their respective contracted conditions.

4. A bed as defined in claim 1, wherein said power operated means comprises individually operable servomotors interposed between said first side portion of the base frame and the respective ends of the intermediate frame, and including means for cyclically operating said servomotors in alternating succession and in opposite phase relation such that one end of said intermediate frame will be raised while the other end is being lowered, and vice-versa.

5. A bed as defined in claim 1, wherein said power operated means comprises a pair of individually operable servomotors interposed between said first side portion of the base frame and the respective ends of the intermediate frame, and including means for selectively controlling the actuation of either servomotor while the other servomotor remains inoperative, whereby to tilt the intermediate frame selectively to either of two longitudinally inclined positions in one of which the head end of the intermediate frame is the higher end and in the other of which the foot end thereof is the higher end.

6. A bed as defined in claim 1, wherein said power operated means comprises individually operable servomotors interposed between said first side portion of the base frame and the respective ends of the intermediate frame, and including means for selectively controlling the actuation of either servomotor while the other servomotor remains inoperative, whereby to tilt the intermediate frame selectively to either of two longitudinally inclined positions in one of which the head end of the intermediate frame is the higher end and in the other of which the foot end thereof is the higher end and control means for effecting simultaneous actuation of both servomotors.

7. A bed as defined in claim 1, wherein said power operated means comprises a pair of hydraulic servomotors 21 and 22 each including a cylinder and a piston therein, with upper and lower hydraulic chambers defined between the piston and the upper and lower ends, respectively, of each cylinder, a pump 91, a fluid reservoir 93, a fluid line connecting the inlet of said pump to said reservoir, a pair of fluid delivery conduits 94, 104 extending in branching relation from the outlet of said pump, said delivery conduits having non-return check valves 95, 105 respectively, and selectively operable valves 96, 106, respectively, therein, a return conduit 103 leading to said reservoir, a pair of intermediate conduits 97, 107, branching from the delivery conduit 94, the intermediate conduit 97 leading to the lower chamber of one of said servomotors and the other intermediate conduit 107 leading to said return line and having a selectively operable valve 108 therein, a first connecting conduit 100, 102 leading from the delivery conduit 104 to the return line and having a selectively operable valve 101 therein, a transfer conduit 98 extending from the upper chamber of said one servomotor to the lower chamber of the other servomotor, whereby fluid exhausted from said upper chamber of said one servomotor will function to actuate said other servomotor, and a second connecting conduit 99 leading from said transfer conduit to a common connection with the delivery conduit 104 and the connecting conduit 101, 102, whereby said servomotors may be operated either in unison and in phase, with both elevating simultaneously, or in alternating phase, with one being elevated while the other is lowered, or independently with one remaining inoperative while the other is actuated.

8. A bed as defined in claim 1, wherein said power operated means comprises a pair of hydraulic servomotors each including a cylinder and a piston therein and having upper and lower fluid chambers defined between the piston and the upper and lower ends, respectively, of each cylinder, a pump, and a system of conduits and valves including a transfer conduit leading from the upper chamber of one servomotor to the lower chamber of the other servomotor, a delivery conduit leading from the outlet of the pump to the lower chamber of said one servomotor, return conduit means leading from said delivery conduit and from said transfer conduit back to the pump, and valve means for controlling return flow through said return conduit means whereby, when said valve means is closed, both servomotors may be simultaneously actuated by pumping fluid into the lower chamber of the one servomotor and thereby forcing fluid from the upper chamber of said one servomotor to the lower chamber of the other servomotor, whereas, when said valve means is open, fluid may escape from both lower chambers back to the pump.

9. In a mechanized bed: a base frame including a base section adapted to rest upon a floor surface and to be secured thereto, said base section including a first side portion, a pair of end frame members projecting upwardly from the respective ends of said first side portion for supporting respective head and foot boards, and a second side portion projecting laterally from said first side portion; an intermediate frame including a first side portion disposed above the first side portion of said base frame and a second side portion projecting laterally therefrom and disposed above the second side portion of said base frame, said second side portions of the respective base and intermediate frames having their respective end extremities offset longitudinally inwardly from the planes of said end frame members to provide transverse vertical clearance spaces adjacent the inner faces of the head and foot board respectively, said spaces being open at the side of the bed; a patient transporting cart member including a top frame, respective leg members projecting downwardly from the ends thereof, and floor engaging roller supports on the respective leg members, said cart member being normally positioned with said leg members and roller supports received within said clearance spaces and with said top frame disposed above said second side portion of the intermediate frame; power operated means for raising said intermediate frame so as to engage said top frame and support said cart as a functional part of the complete bed; said top frame and the first side portion of the intermediate frame having mattress-supporting means, positioned in side by side relation in a common plane when said cart is thus supported by the intermediate frame and adapted when mattress covered to cooperatively provide a patient supporting surface, said cart being adapted, in a lowered position of said intermediate frame, to be supported by said floor surface so that it may be wheeled out of the bed.

References Cited in the file of this patent

UNITED STATES PATENTS

| | | |
|---|---|---|
| 301,477 | Burley | July 8, 1884 |
| 804,784 | Von Eschen et al. | Nov. 14, 1905 |
| 824,057 | Armstrong et al. | June 19, 1906 |
| 920,922 | Csuthy | May 11, 1909 |
| 1,021,693 | McGary | Mar. 26, 1912 |
| 1,121,673 | Sisto | Dec. 22, 1914 |
| 1,658,736 | Ortmeier | Feb. 7, 1928 |
| 2,500,741 | Taylor | Mar. 14, 1950 |
| 2,500,743 | Beem et al. | Mar. 14, 1950 |